US010559987B2

(12) United States Patent
Bernot et al.

(10) Patent No.: US 10,559,987 B2
(45) Date of Patent: Feb. 11, 2020

(54) ELECTROMAGNETIC ARMATURE FOR ROTATING ELECTRICAL MACHINE AND METHOD FOR MANUFACTURING SAME

(71) Applicant: Francecol Technology, Saint Cyr sur Loire (FR)

(72) Inventors: François Bernot, Luynes (FR); Victor Ivan Bernaola Mendoza, Tours (FR); Rodret Charles Mbikou Moutsinga, Tours (FR)

(73) Assignee: Francecol Technology, Saint Cyr sur Loire (FR)

( * ) Notice: Subject to any disclaimer, the term of this patent is extended or adjusted under 35 U.S.C. 154(b) by 0 days.

(21) Appl. No.: 15/826,443

(22) Filed: Nov. 29, 2017

(65) Prior Publication Data

US 2018/0159386 A1 Jun. 7, 2018

Related U.S. Application Data

(63) Continuation of application No. PCT/FR2016/000091, filed on May 30, 2016.

(30) Foreign Application Priority Data

May 29, 2015 (FR) .................................... 15 01107
May 29, 2015 (FR) .................................... 15 01110
May 29, 2015 (FR) .................................... 15 01112

(51) Int. Cl.
| | |
|---|---|
| *H02K 1/08* | (2006.01) |
| *H02K 1/06* | (2006.01) |
| *H02K 1/14* | (2006.01) |
| *H02K 1/02* | (2006.01) |
| *H02K 15/02* | (2006.01) |

(Continued)

(52) U.S. Cl.
CPC ............... *H02K 1/148* (2013.01); *H02K 1/02* (2013.01); *H02K 15/022* (2013.01); *H02K 15/062* (2013.01); *H02K 15/12* (2013.01)

(58) Field of Classification Search
CPC ............ H02K 1/02; H02K 1/04; H02K 1/145; H02K 1/146; H02K 1/148; H02K 15/022; H02K 1/06; H02K 1/08
USPC ........... 310/257, 216.074, 216.091, 216.096, 310/216.097
See application file for complete search history.

(56) References Cited

U.S. PATENT DOCUMENTS

| | | | | |
|---|---|---|---|---|
| 800,382 | A | * | 9/1905 | Mallett .................. H02K 1/148 310/216.079 |
| 6,107,718 | A | * | 8/2000 | Schustek ................ H02K 1/148 29/596 |

(Continued)

*Primary Examiner* — Burton S Mullins
(74) *Attorney, Agent, or Firm* — Christensen O'Connor Johnson Kindness PLLC (57) ABSTRACT

An electromagnetic armature comprising an electromagnetic yoke having a cylindrical surface of axis z, intended to be facing an air-gap. Said cylindrical surface is the interaction surface and comprises a plurality of teeth forming poles, associated with the interaction surface and projecting from same, and disposed at regularly spaced intervals around the whole yoke. Each tooth comprises a recess arranged on one of the faces of the tooth in a so-called polar plane. Each recess is intended to receive the winding. Said teeth are disposed on the yoke in such a way that the recesses are disposed alternately to either side of the polar plane. Alternatively, one or more teeth of the armature can be removed from the yoke.

15 Claims, 3 Drawing Sheets

(51) Int. Cl.
    *H02K 15/06* (2006.01)
    *H02K 15/12* (2006.01)

(56) References Cited

U.S. PATENT DOCUMENTS

| | | | |
|---|---|---|---|
| 6,946,771 B2 * | 9/2005 | Cros | H02K 1/146 |
| | | | 310/198 |
| 2007/0267929 A1 * | 11/2007 | Pulnikov | H02K 1/145 |
| | | | 310/156.02 |

* cited by examiner

ELECTROMAGNETIC ARMATURE FOR ROTATING ELECTRICAL MACHINE AND METHOD FOR MANUFACTURING SAME

CROSS-REFERENCES TO RELATED APPLICATIONS

This application is a continuation of International Application No. PCT/FR2016/000091, filed May 30, 2016, which claims the benefit of French Application No. 1501112, filed May 29, 2015, French Application No. 1501107, filed May 29, 2015, and French Application No. 1501110, filed May 29, 2015, the disclosures of which are expressly incorporated herein by reference in their entirety.

BACKGROUND

Rotating electrical machines with claws in which the stator and/or the rotor can use a claw structure are well known. The best-known is the so-called Lundell machine, which is used in car alternators. These machines with claws have the advantage of the simplicity of their winding, but are penalized by the low induction possible in the air gap and their high leakage rate. In the configuration in which the claws are supplied with alternating power, the machine obtained has advantageous performance, but only at a low speed of rotation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention relates to an electromagnetic armature for a rotating electrical machine, which in particular leads to three-dimensional circulation of the magnetic flux in the machine, and advantageously replaces the conventional claw structures. The invention also relates to its production method.

The invention is more particularly described for a monophase rotating electrical machine, without being limited to this. It also applies equally well to a polyphase machine which comprises at least one phase, and is produced by stacking a plurality of machines according to the invention axially along a single axis of rotation, and optionally connecting them by means of magnetic parts and coils, in order to form composite machines.

DESCRIPTION OF THE DRAWINGS

The present invention is now described by means of examples which are purely illustrative, and in no way limit the scope of the invention, and on the basis of the appended illustrations in which.

DETAILED DESCRIPTION

In the description of the invention, the words "undulating winding" describe the winding of the electrical wires alternately on one side and the other of each magnetic pole, thus forming a coil which is wound around magnetic poles, except on at least one of the faces of the pole.

In the description of the invention, the words "imbricated winding" describe the winding of the electrical wires all around each magnetic pole.

In the description of the invention, the words "electromagnetic armature" designate either a stator or a rotor of a rotating electrical machine, the armature being characterized in that it generates a magnetic flux which is discharged from it in a substantially radial direction at the air gap surface. Said electromagnetic armature is characterized by some or all of the following points:

- it can be supplied with alternating or direct or pulsed current, or also current in any form;
- it can be either in a single piece or formed by a plurality of independent electromagnetic armatures which are associated parallel to the axis of rotation, in order to form a polyphase machine;
- it is incorporated in a cylinder with an axis z;
- it is either hollow or solid in its center;
- it can optionally receive either an electrical winding, or a set of magnets, or be passive (without magnets or winding);
- it generates a magnetic flux in the air gap surface with a substantially radial direction;
- it comprises an even number of magnetic poles known as "Npp", which number corresponds to the number of pairs of alternation of magnetic flux input (South) and output (North) in the radial direction with an axis z through its air gap surface;
- it can form the inductor or armature element of a rotating electrical machine.

In the description of the invention, the words "rotating electrical machine" describe any sort of electrical machine, particularly with direct current, which is synchronous with magnets, synchronous with a wound rotor, asynchronous with a squirrel cage rotor, asynchronous with a wound rotor, or step-by-step (known as with variable reluctance). Said rotating electrical machine comprises at least one inner electromagnetic armature and at least one outer electromagnetic armature, separated by an electromagnetic air gap which corresponds to a substantially annular volume defined by two cylinders which are centered on an axis z and have the same axial length. Said electromagnetic air gap defines a median interaction surface between the magnetic fluxes obtained from the inner and outer electromagnetic armatures which are respectively opposite one another.

In the description of the invention, the axis which is known as z corresponds to the axis of rotation of the electrical machine, the axis which is known as x corresponds to the direction which is tangential to a cylinder centered on the axis z, and the axis y corresponds to the direction of a radius of a coplanar disc which is centered on the axis z with the words polar plane designating a plane which is orthogonal to the axis z.

In the description of the invention, the words "mean air gap" define the smallest radial distance in the radial direction with an axis y between two electromagnetic armatures which are opposite one another.

In the description of the invention, the words "air gap surface" designate a cylinder with an axis z which corresponds to the surface of magnetic interaction between the inner and outer electromagnetic armatures.

In the description of the invention, the word "winding" describes a set of electrical conductors which are inserted in one of the electromagnetic armatures, in order to generate a magnetic flux which passes through the air gap surface in a radial direction.

In the description of the invention, the abbreviation "SMC powder" (SMC denotes Soft Magnetic Composites) describes a powder based on iron characterized by the partial electrical insulation of the elementary particles which form it, such as, for example, the SMC powder made by Höganäs, which powder is compressed according to one of the methods in the following non-exhaustive list: hot- or cold-pressed iron powder, iron powder which is hot or cold pressed then hot fired, ferrite, or sintered iron powder, which method, when applied to the SMC powder, makes it possible to obtain a magnetic circuit, the losses of which by Foucault current are reduced, with an isotropic magnetic characteristic.

Figure 1:
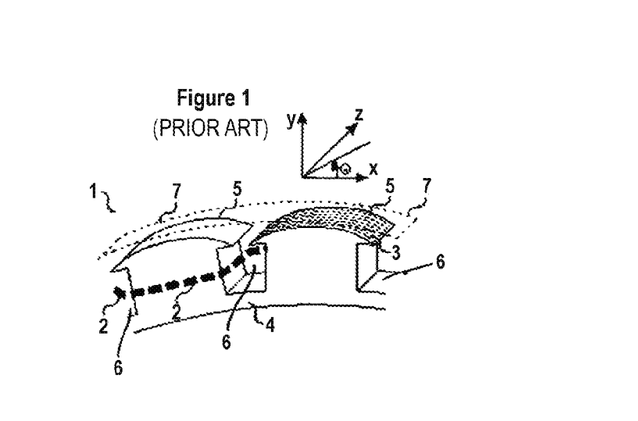
FIG. 1 represents a partial view in perspective of an electromagnetic armature according to the prior art.

FIG. 1 represents a partial view in perspective of an electromagnetic armature according to the prior art.

In a known manner, an electromagnetic armature 1 as illustrated in FIG. 1 is formed by coplanar metal plates 3 which are stacked axially along the axis z, in order to form a set of metal plates 4. The metal plates are arranged on a coplanar plane x-y, and are stacked in parallel in the direction z. The armature 1 comprises alternation of magnetic poles 5 defined by alternation of notches 6. The magnetic poles 5 form what is known hereinafter as teeth. A winding 2 is wound around each magnetic pole 5, in order to create a flux which enters and exits alternately between the successive magnetic poles 5. Said winding can be produced in an undulating manner (i.e. going from one magnetic pole to another, and changing face at each magnetic pole), or imbricated and surrounding each of the magnetic poles 5 completely. The winding 2 is schematized by a single thick broken line; in reality, the winding comprises a plurality of turns which extend on the surface of the polar planes, as well as in thickness, according to the axes z and x, and fills the space between the teeth. The electromagnetic armature 1 thus formed is placed opposite an electromagnetic air gap surface 7.

In this known configuration, the coil heads, i.e. the part of the winding which circulates along a polar plane x-y have a substantial thickness in the direction z, which wasted space does not produce any electromagnetic torque directly.

In addition, winding electrical wire around teeth of the armature is a lengthy, delicate operation, and requires meticulousness in order to position the wire neatly and optimize the quantity of wire wound, in particular in order to optimize the production costs (winding time, and quantity of raw material used, in particular when this is copper).

The objective of the invention is thus to provide an electromagnetic armature configured to receive a winding which does not have the disadvantages of space required, generated in particular by the presence of the coil heads according to the prior art, or of low induction, and/or which makes it possible to arrange the winding in an optimum manner relative to the teeth of the armature, in order to increase the quantity of winding. The aim of the invention is also to facilitate the production of an armature of this type in order to associate a winding with it.

According to the invention, the electromagnetic armature comprises an electromagnetic yoke having a cylindrical surface with an axis z which is designed to be opposite an air gap surface, the cylindrical surface being known as an interaction surface, a plurality of teeth forming magnetic poles, the teeth being associated in a projecting manner with the interaction surface in the direction of the air gap surface, and disposed spaced all around the yoke, and it is characterized in that each tooth comprises a recess arranged in one of the faces of the tooth on a so-called polar plane orthogonal to the direction z, the recess being designed to receive a winding, and in that said teeth are arranged on the yoke such that the recesses are disposed alternately on both sides of the polar median plane which passes through the middle of the yoke, i.e. the recesses in two adjacent teeth are arranged respectively in two opposite faces which are coplanar to two opposite polar planes perpendicular to the axis z.

Thus, the recesses make it possible to accommodate the winding, saving space in the direction z, and consequently decreasing the thickness of the winding at the winding heads, which makes it possible in particular to reduce the electrical resistance and the losses by Joule effect. In addition, the quantity of copper is reduced when the winding is made of copper, thus decreasing the production costs.

According to one characteristic, the winding is imbricated, i.e. it surrounds completely the periphery of the teeth whilst being accommodated in each recess.

In a preferred variant, the winding is undulating, i.e. it passes along only part of each tooth (and not completely around it), going from one magnetic pole to another, and changing polar face at each magnetic pole, whilst being accommodated in each recess.

This undulating winding configuration passing alternately on only a single side of a pole makes it possible to reduce the winding thickness according to the axis z, by eliminating the winding at the coil head, whilst ensuring the induction required for each pole. In addition, the losses by induction are reduced, and the magnetic torque can be improved.

According to another characteristic, one or a plurality of teeth is/are independent from the yoke, and is/are added on in a detachable manner against the yoke (against the interaction surface).

The invention also relates to an electromagnetic armature comprising an electromagnetic yoke which has a cylindrical surface with an axis z designed to be opposite an air gap surface, the cylindrical surface being a so-called interaction surface, a plurality of teeth forming magnetic poles, the teeth being associated in a projecting manner with the interaction surface in the direction of the air gap surface, and disposed spaced all around the yoke, characterized in that at least one tooth is independent from the yoke, and is added on in a detachable manner against the yoke (against the interaction surface).

Thus, the detachability of one or a plurality of teeth provides a plurality of winding possibilities, in order to associate the wire with each tooth in an optimum manner, so as to minimize the quantity of wire and minimize the wire thickness at the coil head. As will be seen hereinafter, several examples of winding and association of the winding with the yoke are proposed with detachable teeth.

The armature preferably comprises a plurality of added-on detachable teeth, said added-on teeth being able to be successively adjacent or not adjacent, or alternately adjacent or not adjacent.

The teeth of a single armature can have forms which are identical or not identical.

The teeth can comprise recesses as previously described. Thus, the teeth do or do not comprise a recess arranged alternately on both sides of the polar median plane.

The teeth are formed by a stack of metal plates or from SMC powder.

According to another characteristic of the invention, when the teeth are formed by stacked metal plates, the electromagnetic yoke is formed by metal plates which are arranged substantially parallel to a plane x-y perpendicular to the axis z, and stacked in the direction z, whereas the teeth are formed by metal plates which are arranged substantially parallel to the plane y-z, and stacked either in the polar direction of rotation known as Θ, or in the tangential direction x, or in a variable direction substantially perpendicular to the axis of rotation z. As a variant, the stacked metal plates 15 are not arranged parallel to the plane y-z, but angularly relative to this plane, i.e. angularly relative to the axis z; the metal plates are then said to be twisted. The metal plates of the poles are thus arranged on planes which are not parallel to the planes where the metal plates of the yoke are arranged.

Preferably, the teeth cooperate with the yoke by mutual engagement according to a limited radial thickness, preferably according to a thickness less than 10 mm, in particular approximately 1 mm.

According to another characteristic, the teeth are associated with the yoke by fitting with or without play, and/or adhesion, and/or by means of an element for interfacing and rendering integral. Fitting without play takes place by forcing.

The number of teeth is at least equal to the number of magnetic poles of the electrical machine for which the armature is destined.

According to another characteristic, the surface of interaction between the yoke and the teeth is substantially circular, and is defined by a line of separation which is translated in the direction of the axis z, the line of separation being:
- either a portion of a circle or an ellipse, or a straight line, or a triangle;
- or a broken line, which in particular is rectangular or triangular or trapezoidal, thus making it possible to push the tooth into the yoke, the tooth preferably being pushed into the yoke in a direction which is inclined relative to the tangential surface of the yoke, and preferably according to a dimension of approximately D/2, where D corresponds to the width of the tooth in the direction x;
- or a broken rectangular or triangular line which makes it possible to place the tooth above the yoke.

Advantageously, the winding and/or the yoke and the teeth of the armature are covered with a thermal lacquering insulating resin based on silicon, of the type used for thermal lacquering of flat metal plates known as thermal plates, or for thermal ovens or barbecues or table cookers, in particular resin comprising at least 20% silicon, or also at least 98% silicon, and which can also comprise acrylic and/or epoxy.

The invention also relates to a method for production of an electromagnetic armature according to the invention, characterized in that the winding is configured before association with the yoke, or is obtained on the yoke by winding at least one electrically conductive wire, and in particular the winding is produced or is associated with the armature from amongst the following possibilities:
- the winding is produced on an annular spindle;
- the winding is produced on detachable false teeth which are fitted on the yoke;
- the previously produced winding is associated with the bare yoke, keeping it in place by means of wedges which are disposable or removable after insertion, then the teeth are arranged;
- separating the winding into sub-windings which are inserted separately;
- inserting the winding on the yoke where only some of the teeth, i.e. those with the same polarity, have been put into place definitively;
- using detachable false teeth during the step of insertion of the winding, then replacing them by the definitive teeth, the false teeth advantageously being made of plastic material or of polished stainless steel.

The method according to the invention makes it possible in particular to facilitate the winding process, to position the winding accurately and regularly, and to arrange it an optimum manner. In addition, as a consequence the quantity of wound wire is reduced.

The winding wire can be a round wire or wire with a flattened part.

The invention also relates to a method for high-temperature insulation of electrical conductors for an electrical machine, making it possible to use the machine at temperatures higher in particular than 250° C. The increase in the temperature makes it possible to increase the power supplied by the electrical machine.

More particularly, the method for production of the armature according to the invention uses the electrical insulation method according to the invention.

In the following description, the words "electrically conductive" describe at least one electric wire, and in general a plurality of electric wires, wound around a magnetic flux tube in order to generate a magnetic flux in it, which magnetic flux is direct or alternating.

In the description of the invention, the words "electric wire" describe the electric wire(s) which form(s) the electrical conductor. The electric wires can have an outer form which is flattened, hexagonal, round, square, rectangular, or any other form, which is regular or not regular. Said electric wires can be solid or hollow. Said electric wires can be constituted by one or a plurality of wires, which are or are not insulated against one another, and grouped together in order to form a single electric wire through which a single electric current passes. The electrical conductor can be formed by gathering together a plurality of electrical conductors gathered in sub-groups.

In the description of the invention, the arrangement of the electrical wires relative to one another within a single electrical conductor or within a single electric wire can use all the configurations known in the prior art, such as parallel arrangement, Roebel, diagonal, twisted, or any other type of arrangement.

In a known manner, an electrical machine receives electrical conductors in its rotor and/or in its stator, which are optionally accommodated in notches provided in a magnetic circuit or in a non-magnetic casing, as applicable.

The method for insulation between the electrical conductor and its support which conducts electricity, which can be a magnetic or non-magnetic circuit.

In the description, the words "electrical support" describe one or a plurality of parts which receive an electrical conductor, which parts conduct electricity partially or completely. Said assembly of parts can be limited to a single part or it can be formed by a plurality of parts with an identical or different material and form. The electrical support can be either ferromagnetic or non-ferromagnetic.

In the description of the invention, the electrical insulation method applies both firstly to the electrical insulation between the electrical conductor and the electrical support, and secondly to the electrical insulation between the different electrical conductors which form a single electrical conductor, one and/or the other of said cases being able to use the insulation method according to the invention.

The insulation method is used in particular in the process for production of the electromagnetic armature according to the invention in relation to the winding of the armature. The insulation applies equally well to the conductive wires which form the winding and to the winding with the yoke and the associated teeth.

According to the invention, the winding and/or the yoke and the teeth of the armature are covered with a thermal lacquering insulating resin based on silicon, of the type used for thermal lacquering of flat metal plates known as thermal plates, or for thermal ovens or barbecues or table cookers.

In the description of the invention, the words "insulating resin" describe a powder which is applied either by electrostatic spraying, or by any other method according to the prior art, on the parts to be insulated. The insulating resin is designed for application on hot parts, such as walls of ovens, barbecues, or table cookers. These parts withstand very high temperatures, of more than 250° C., or also direct contact with a flame.

The insulation method comprises the following steps:
in a first step, coating each of the elements which constitute the wire(s) forming the winding, as well as optionally the winding support(s), such as the yoke and/or the teeth, with a thermal lacquering insulating resin based on silicon, of the type used for thermal lacquering of thermal flat metal plates or thermal ovens or barbecues or table cookers, the insulating resin preferably being applied by means of an electrostatic process, using a powder which is sprayed;
in a second step, curing the insulating resin in an oven at a normal temperature, indicated by the manufacturer, typically 220° C., or curing the resin at a temperature lower than the nominal polymerization temperature, for example between 150° C. and 180° C.;
in a third step, assembling the elements when cold or hot;
in a fourth step, if applicable repeating the three preceding steps on the assembled assembly formed by the winding, the yoke and the teeth; if, in a second step the curing has been carried out at a temperature lower than the nominal polymerization temperature, curing of the assembled assembly is then necessary.

The insulating resin is preferably applied by means of an electrostatic process using a powder which is sprayed.

According to one characteristic, the insulating resin based on silicon is a thermosetting resin. It comprises at least 20% silicon, or also at least 98% silicon.

As an example of an embodiment, the insulating resin used has the reference HT550 made by Interpon, containing 100% silicon, and typically withstands 550° C. maximum operating temperature.

The insulating resin can also comprise acrylic and/or epoxy.

According to one embodiment, the insulating resin used has the reference HT350 made by Interpon, containing silicon, epoxy and acrylic, and typically withstands 350° C. maximum operating temperature.

According to another embodiment, the insulating resin used has the reference HT450 made by Interpon, containing silicon and acrylic, and typically withstands 450° C. maximum operating temperature.

In the description of the invention, application of the innovative high-temperature electrical insulation method involves at least the surfaces of the electrical conductors and of the electrical supports which are opposite one another, and must be physically separated by a distance suitable for the voltage used by the electrical machine, in order to prevent electrical discharges. The electrical insulation coating made of resin can overflow from said surfaces, or also cover all of the machine in order to simplify its design. Preferably, said insulation method is applied to all of the electrical conductors, electric wires and electrical supports which form the electrical machine, using the same resin on all of these parts.

The curing/polymerization operation(s) can be repeated for each assembly of a conductor unit in an electrical support, or said curing/polymerization operation can be carried out in a single step once the electrical machine has been assembled.

Finally, the invention relates to a rotating electrical machine comprising at least one electromagnetic armature according to the invention forming a stator, and an annular magnetized rotor, the magnets of which are situated opposite the air gap surface, in order to constitute a monophase machine with a single electromagnetic armature, or a polyphase machine comprising an assembly in the direction of the axis z of a plurality of spaced electromagnetic armatures.

Figure 2:
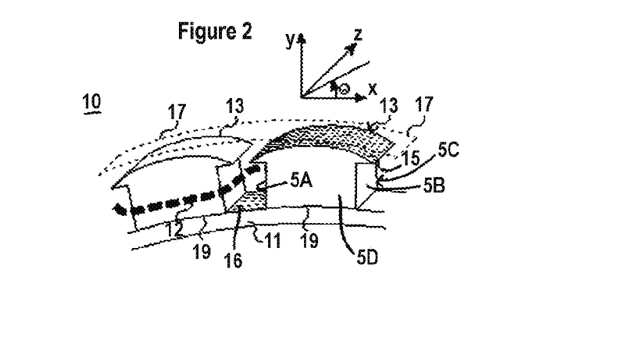
FIG. 2 represents a partial view in perspective of a first embodiment of an electromagnetic armature according to the invention.
Figure 3:
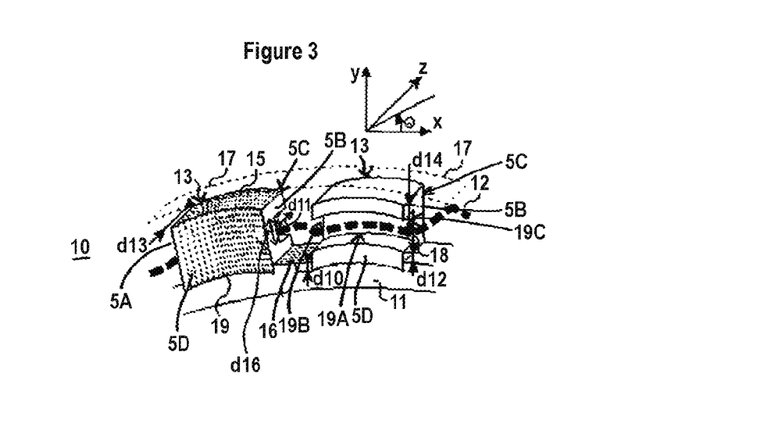
FIG. 3 represents a partial view in perspective of a second embodiment of an electromagnetic armature according to the invention.
Figure 4:
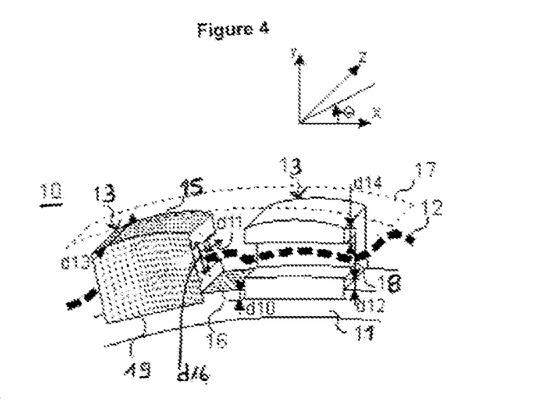
FIG. 4 represents a variant of FIG. 3.
Figure 5A:
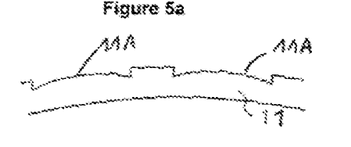
FIGS. 5a and 5b are views in cross-section according to a polar plane, of the yoke of the magnetic armature, respectively in FIGS. 3 and 4.
Figure 5B:
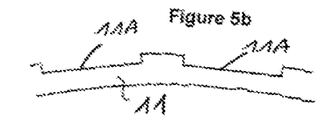

The electromagnetic armature 10 according to the invention illustrated in FIGS. 2 to 4 comprises an electromagnetic yoke 11, a winding 12, and teeth 13 which are associated with the cylindrical surface with an axis z of said yoke 11, projecting relative to this surface opposite a magnetic air gap surface 17.

The cylindrical surface opposite the air gap 17, which is the one associated with the teeth 13, is known as the mechanical interaction surface. This mechanical interaction surface is substantially annular.

Preferably, the yoke 11 is formed by flat metal plates 16 which are arranged substantially parallel to the plane x-y, and stacked in the direction z.

The teeth 13 are spaced from one another. They are distributed at regular intervals all around the mechanical interaction surface of the yoke 11.

The teeth 13 which receive the winding 12 thus form opposite the air gap surface 17 the equivalent number of successive magnetic poles with successively alternating North and South polarities. The number of teeth 13 is at least equal to the number of magnetic poles of the electrical machine.

In the embodiment in FIG. 2, the teeth 13 are formed by flat metal plates 15 arranged on the same planes as the metal plates 16 of the yoke 11, and stacked in the direction of the axis z.

In the embodiment in FIG. 2, the teeth 13 are solid, whereas in that in FIGS. 3 and 4, the teeth 13 are hollow, as will be seen hereinafter.

In the examples in FIGS. 3 and 4, the teeth 13 are preferably formed by flat metal plates 15 arranged substantially parallel to the plane y-z, and stacked either in the polar direction of rotation indicated as Θ, or in the tangential direction x, or in a variable direction which is substantially perpendicular to the axis of rotation z. As a variant, the metal plates 15 are not arranged parallel to the plane y-z, but angularly relative to this plane, i.e. angularly relative to the axis z; the metal plates are then said to be twisted. The metal plates 15 of the teeth/poles 13 are thus arranged on planes which are not parallel to the planes of arrangement of the metal plates 16 of the yoke 11.

In particular, the magnetic flux which is generated by the winding 12 circulates in the yoke 11 in a main direction of rotation Θ, whilst being circumscribed on a plane parallel to the plane of the metal plates 15, and therefore without generating Foucault currents, since it follows the direction of the metal plates 16. Then, before rejoining the air gap surface 17, said magnetic flux passes in a substantially radial direction of the teeth 13, following a plane y-z, and therefore without generating Foucault currents there, since it follows the direction of the metal plates 15 of the teeth, which are advantageously not oriented parallel to the metal plates 16 of the yoke. It appears that a three-dimensional circulation of the magnetic flux is then obtained in the magnetic armature, using cut flat magnetic metal plates which are oriented differently between those of the yoke and those of the teeth.

Each tooth has a face in contact with the yoke 4, a face opposite facing the air gap surface 17, two faces opposite known as radial faces 5A and 5B (parallel to the plane y-z), each radial face being opposite a radial face of an adjacent tooth, and two opposite faces 5C and 5D known as polar faces, parallel to a polar plane.

The winding 12 extends on planes parallel to the surface of interaction of the yoke. It can be arranged all around the periphery of a tooth 13. According to a preferred variant (FIGS. 2 to 4), it has a so-called undulating form, whilst being associated with each of the teeth 13 and going from one magnetic pole to another, changing polar face at each magnetic pole. Thus, for one of the teeth 13, the coil 12 is associated with the face 5C, whereas for the adjacent tooth, it is associated with the opposite face 5D.

In the embodiments of the teeth in FIGS. 3 and 4, each tooth 13 comprises a recess 18 in one of its polar surfaces 5C or 5D. The recess 18 receives the winding 12. The recess 18 has an open section, in particular in the form of a "U". The recess comprises a longitudinal opening 18A which faces a polar plane (plane parallel to the plane x-y) and two opposite lateral openings 18B and 18C which are coplanar respectively to the opposite radial faces 5A and 5B.

Since the recess 18 is present only in one of the two polar faces of the tooth, it is thus disposed alternately in one of the faces of each pole (at the face of a coil head).

Consequently, so as to gain winding space, the armature 10 according to the invention is configured:
  either by having teeth 13 with a solid peripheral surface (i.e. without a recess), preferably combined with an undulating winding 12 (FIG. 2);
  or by having teeth 13 which are each provided with a recess 18, combined with an imbricated or preferably undulating winding 12 (FIGS. 3 and 4).

Thus, the lateral extension of the winding 12 in the direction of the axis z at the heads of the coils appears to be reduced, which makes it possible to increase the active electromagnetic interaction surface 17.

In the examples in FIGS. 3 and 4, the teeth 13 are disposed on the yoke 11 such that their recess 18 is disposed alternately on both sides of the polar median plane which passes via the middle of the yoke 11, so that the winding 12, by being undulating, is wound alternately on both sides of said teeth 13.

According to a particular embodiment, the teeth 13 are divided into a plurality of parts, arranged in parallel substantially in an angular direction Θ. According to another particular embodiment, the yokes 11 are divided into a plurality of parts arranged in parallel in a direction with an axis z.

With reference to FIGS. 2 to 4, the electromagnetic armature 10 (and therefore the yoke 11 and each tooth 13) has a length in the direction with an axis z known as d13. The teeth 13 can have a length along the axis z which is equivalent to the length of the yoke, or they can be smaller or larger than this length.

The air gap or distance which is indicated as Heo with a radial direction y between the end of the metal plates 15 opposite the air gap 17 and said air gap surface 17 follows a particular law, in particular according to the formula:

$$\text{air gap} = Heo = (\text{mean air gap})/(\cos(\text{local electrical angle}))$$

The local electrical angle is defined as being the mechanical angle at the local point of estimation of the air gap multiplied by the number of pairs of magnetic poles.

The mean air gap defines the smallest radial distance in the radial direction with an axis y between the free surface of a tooth and the magnetic armature opposite, beyond the air gap surface.

Said radial distance Heo is imposed by the form of the joining line 19 between the metal plates 15 and the yoke 11 (FIGS. 2 to 4), which reproduces the function describing the air gap.

Preferably, the joining surface between each of the teeth 13 and the yoke 11 is obtained by the linear translation substantially in the axial direction z of the joining line 19. As a variant, said joining surface between each of the teeth 13 and the yoke 11 is obtained by translating the joining line 19 linearly in a direction which is inclined relative to the axis z.

According to a first particular embodiment (FIG. 3), the teeth 13 are formed from magnetic metal plates which are all substantially identical.

According to another embodiment of the metal plates 15 of the teeth 13, illustrated in FIGS. 3 and 4, the metal plates 15 have radial heights which are different from one another.

The joining line 19 between each of the teeth 13 and the yoke 11 can have different geometries, i.e. any line or a line which is broken into at least two substantially straight sections forming a triangle or a rectangle. This configuration means that the metal plates 15 which form the teeth 13 must have a radial height in the radial direction with an axis y which is different from one to another, in order to provide the air gap with a suitable form, such as a ring with a constant thickness in the radial direction with an axis y, or as a variant a variable thickness in the radial direction with an axis y. With reference to a variable thickness of the air gap, the metal plates 15 can be grouped in sets with an identical height in the direction y, in order to provide the air gap 17 with the form of a staircase.

Figure 8A:
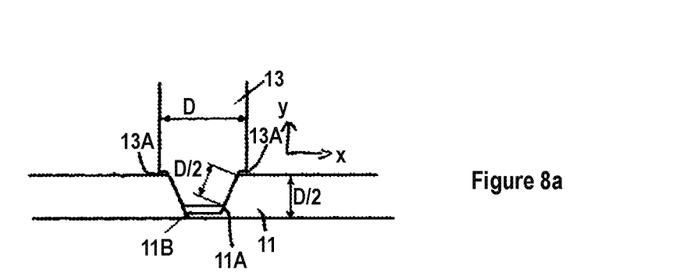
FIGS. 8a and 8b illustrate two particular examples of a joining line of a tooth pushed into the yoke of the armature.
Figure 8B:
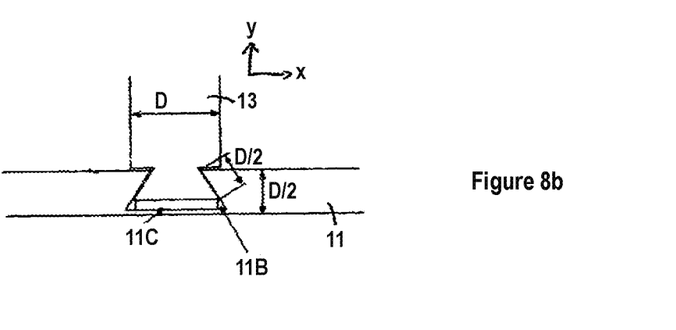

In two other particular embodiments with reference to FIGS. 8a and 8b, the joining line 19 has a form which can be classified as trapezoidal, i.e. the yoke 11 comprises cavities 11A to accommodate the teeth 13, the walls of which are inclined in a manner which is divergent or convergent relative to the tangential surface of the yoke. Preferably, each tooth 13 is pushed in such that the dimension of the tooth introduced into the yoke in the direction of inclination is approximately D/2, where D corresponds to the width/thickness of the tooth in the direction x. In addition, the yoke preferably has a radial dimension along the axis y which is equivalent to D/2.

According to yet another embodiment of the metal plates, the teeth 13 are made of SMC powder, instead of stacked metal plates.

According to a preferred embodiment of the invention, at least one tooth is independent from the yoke 11 before being assembled on the latter. The tooth is so-called detachable; it is detachable at least before assembly on the yoke.

The detachable teeth can be solid or can have a recess 18.

All of the teeth 13 of the armature can be detachable and added onto the yoke, or only some of them can be detachable (teeth which may or may not be immediately adjacent).

The teeth 13 cooperate with the yoke by mutual engagement according to a limited radial thickness.

The teeth 13 are associated with the yoke, preferably by being fitted together.

With reference to FIGS. 3 to 5b, the teeth are pushed partially into the yoke 11, the yoke comprising suitable receipt cavities 11A (FIGS. 5a and 5b), the surface of interaction of which follows the joining lines 19 of the teeth 13. The length d10 (FIGS. 3 and 4) of pushing, in the radial direction with an axis y of each of the teeth 13 into the yoke 11, is preferably between a value of zero and 10 mm. Preferably, said pushing-in length d10 must be short, and typically 1 mm, in order to prevent Foucault currents in the area of interaction, because of the local deflection of the magnetic flux.

According to a first preferred variant embodiment, the teeth 13 are forced into the cavities in the yoke 11, optionally being glued into them. According to a second variant, the teeth 13 are pushed with a very slight gap into the cavities in the yoke 11, and are glued into them.

When the teeth are pushed in, they can have shoulders 13A which are applied on the surface of the yoke 11 (FIGS. 8a and 8b). A functional gap can be provided between the shoulders 13A and the yoke 11, as well as in the base of the cavity 11A (thus providing a space 11B). A wedge 11C (FIG. 8b) can if necessary be arranged in the base of the cavity 11A at the space 11B.

According to another mode of association, not illustrated, of the teeth and the yoke, the yoke comprises radial protrusions on which the teeth are positioned, and to which they are glued. The teeth can also comprise cavities in order to engage on the protrusions, whilst being fitted and/or glued onto them.

According to yet another mode of association, the teeth 13 are retained on the yoke 11, either by means of an additional gluing resin, with the electromagnetic armature assembly, or by means of a non-magnetic part, such as plastic, stainless steel or any other material, or by means of a band placed in the air gap.

When the teeth have the recess 18, their dimensions are as follows, with reference to FIGS. 2, 3 and 6.

d11 is the dimension of the recess 18 along the axis z.

The dimension d11 is smaller than the distance between two successive armatures 11, if the rotating machine is designed to comprise a plurality of armatures. Preferably, d11 is equal to half the distance which separates two successive armatures.

By way of example, the distance between two successive electromagnetic armatures is between 1 mm and 5 mm.

d16 is the radial height of the recess 18 in the direction y. Said radial height is preferably less than five times the polar length of a tooth 13. The polar length corresponds to the distance along the axis z which separates the polar faces 5C and 5D of a tooth, i.e. d13.

Figure 6:
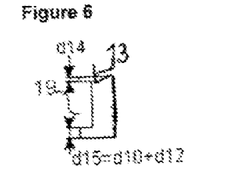
FIG. 6 is a view in cross-section on a plane y-z transverse to a polar plane, of a tooth of the magnetic armature in FIG. 2.
Figure 7:
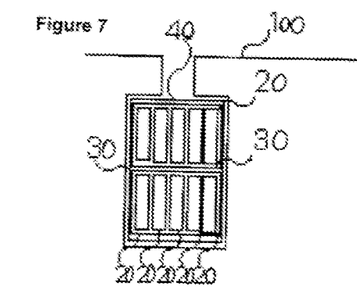
FIG. 7 illustrates a view in schematic cross-section of the organization of the electrical conductors in an electrical support coated with an electrical insulation resin.

With reference to FIGS. 2, 3 and 6, at the junction between the tooth 13 and the yoke 11, the dimension d12 of the recess in the radial direction y of the metal plates 15 is preferably between 0 mm and the polar length d13 of a tooth 13, in particular between 1 and 4 mm. The value d12=2 mm corresponds to an optimum between the constraint of minimization of the iron losses in the joining area 19, and the loss of volume of winding induced by the gap left between the winding 12 and the yoke 11.

The dimension d15 is given by d10+d12.

At the junction between the air gap and the tooth 13, the dimension d11 of the recess in the radial direction y of the metal plates 15 is preferably given by the following formula:

$$d11 = d11 \times (d15-d11)/d15$$

The method for production of the armature according to the invention is as follows.

According to a preferred embodiment, the winding 12 is produced outside the electromagnetic armature 10, by winding the wire on an annular spindle, which assembly is then formed, in order to be able to be placed between the teeth 13, to form an undulating winding 12. The winding 12 can be either flexible or rigid before being introduced into the electromagnetic armature 10 in its final place.

Preferably, the coil 12 is inserted on the yoke 11 where only some of the teeth 13 with the same polarity have been put into their place definitively. Thus, all the teeth 13 corresponding to the same polarity (either North or South), these teeth then being detachable, are absent during the insertion of the previously formed winding 12, in order to permit the introduction of the latter in the direction of the axis z. The missing teeth (which have a pole opposite that of the teeth already in place on the yoke) are inserted in their place once the winding 12 has been inserted on the teeth 13 with a similar polarity which are already in place.

Other combinations of partial insertions of the teeth 13 and the coil 12 are possible, selected for example from the following non-exhaustive list:
 insertion of the coil 12 on the bare yoke 11, and retaining it by means of wedges which are disposable or removable after insertion, then insertion of the teeth 13;
 separation of the coil 12 into sub-coils which are inserted separately;
 use of the removable false teeth during the step of insertion of the winding, then replacement of these by the definitive teeth 13, the false teeth advantageously being made of plastic material or polished stainless steel.

The electromagnetic armature according to the invention can be insulated by means of a high-temperature insulation method based on silicon, as will be seen later.

All of the description of the invention has been provided for a rotating electrical machine, the air gap surface of which is a cylinder centered around its axis of rotation z. The transposition of the invention to a machine of a discoidal type, in which the air gap surface is a disk, which is annular or solid, centered on the axis of rotation, will be apparent to persons skilled in the art, using appropriate design symmetries, which for example transpose the radial fluxes into tangential fluxes, and vice versa.

It will be appreciated that the description of the invention extends to all the operating modes of the rotating electrical machine described, in the four operating quadrants of the torque-speed plane of the shaft, and consequently in motor, generator and braking modes, in the positive and negative directions of rotation.

It will be appreciated that the invention applies to any electromagnetic armature used to produce either a stator or a rotor of a rotating electrical machine, said armature being able to be supplied with direct or alternating current.

It will be appreciated that, in the description of the invention, the transition from a structure with an external motor, as illustrated, to a structure with an internal rotor, is carried out by mirror effect relative to the air gap surface, as described in the prior art, using radial symmetry centered around the air gap surface.

It will be appreciated that the description of the rotating electrical machine according to the invention extends to a linear electrical machine, by carrying out an appropriate transformation, which develops the dimensions on the polar axis x into linear dimensions.

Some or all of the ferromagnetic parts which constitute the invention can be made of SMC powder.

The electromagnetic armature according to the invention can be used to produce a composite, synchronous or asynchronous homopolar machine. The resulting electrical machine can be controlled by a control algorithm in an open voltage loop, optionally associated with a process for reduction of the noise of its encoder.

When the electromagnetic armature is designed for a polyphase machine, a plurality of monophase armatures, such as the one described with reference to FIGS. 2 to 4, are stacked spaced from one another along the axis z. In this embodiment, a plurality of teeth or all the teeth of each armature, or of at least the second armature onwards, are detachable. In addition, the monophase armatures of the polyphase machine are arranged between one another such as to ensure angular offsetting between the magnetic poles of two consecutive armatures. This interphase angular offsetting is equal to (360°/Npp)/Nphases, where Npp is the number of magnetic poles, and Nphases is the number of phases (number of armatures).

All the elements which have been described in this invention can be extended to other rotating or static electrical machines comprising any number of electrical phases and electromagnetic magnetic poles. The present invention is not limited to the embodiments described, but extends to any modification and variant apparent to persons skilled in the art, whilst remaining within the scope of protection defined in the appended claims.

A description is now provided of the method for electrical insulation of the electrical conductors of the winding and/or of the yoke and/or of the teeth of the armature according to the invention. The insulation method uses a thermosetting insulating resin based on silicon which is resistant to high temperature, in particular to a temperature higher than 250° C.

In order to facilitate understanding, the insulation method is described with reference to FIG. 6, which is a general schematic figure of an electrical conductor 40, associated with/fitted on its electrical support 100.

The electrical conductor 40 is formed by gathering together a plurality of electric wires 20, which are integrated for example in a notch formed in the electrical support 100. The electric wires are arranged parallel to one another, in superimposed layers 3. The superimposed layers form a winding, such as the winding of the armature according to the invention previously described. The support 100 corresponds for example to the armature 10 according to the invention previously described.

The number of superimposed layers depends on the application, and is equal to a unit or more. Each electric wire is insulated independently by the insulating resin applied to the bare electric wire before its insertion in the electrical support 100. Said electric wire is preferably constituted by copper or aluminum.

The electric wires 20 can all have substantially the same form and the same transverse cross-section. As a variant, the electric wires 20 have different transverse cross-sections.

According to a particular embodiment, the electric wires 20 are insulated with the same insulating resin as the electrical support 100.

By way of example, the resin is applied to each of the wires and cured, then the wires coated with resin are gathered together to form the winding.

According to a particular embodiment, the insulation method is implemented in a plurality of successive steps, as follows:

in a first step, before assembly of the electrical conductors 20 in the electrical support 100, each of the electrical conductors 20, as well as the electrical support 100, are coated independently from one another with insulating resin;

in a second step, each of said electrical conductors 20, as well as the electrical support 100, are cured separately at their nominal polymerization temperature;

in a third step, each of said electrical conductors 20 coated with the polymerized resin is inserted in the electrical support 100 which is also coated with the polymerized resin;

optionally, in a fourth step, said electrical conductors 20 are insulated a second time by depositing of a second layer of insulating resin on the assembly of the conductors and the support, the conductors being formed by their association with the support by successive layers, which insulating resin is preferably identical to the resin used in the first step. Then, the assembly of the electrical conductors 20 and the electrical support 100 coated with the second layer of resin is cured at the nominal polymerization temperature of the resin.

In the description of the invention, the polymerization temperature is associated with a heating and cooling cycle specific to each resin, which is indicated clearly by its manufacturer. Typically, said polymerization temperature is substantially 220° C., which value is lower than the maximum temperature of use of the elements covered by the resin.

According to another particular embodiment, the insulation method is implemented in a plurality of successive steps as follows:

in a first step, before assembly of the electrical conductors 20 in the electrical support 100, each of the electrical conductors 20, as well as the electrical support 100, are coated independently from one another with insulating resin;

in a second step, each of said electrical conductors 20, and/or the electrical support 100, are cured separately at a temperature lower than their nominal polymerization temperature, for example in a range between 150° C. and 180° C., then cooled. The choice of said curing temperature lower than the nominal value is determined preferentially, firstly in order to allow the electrical conductors 20 and the electrical support 100 to be covered with a film of resin which is flexible enough to withstand the bending during the insertion of the conductors in the support, and secondly to make possible improved adhesion during the final step of final curing between the different assembled parts. In this second step, it is possible to cure at the nominal polymerization temperature only the electrical conductors 20, or only the electrical support 100;

in a third step, each of said electrical conductors 20 coated with the hardened resin is inserted in the electrical support 100 which is also coated with the cured resin;

in a fourth step, said electrical conductors 20 are insulated a second time by depositing of a second layer of insulating resin on the assembly of the conductors and the support, the conductors being formed by their association with the support by successive layers, which insulating resin is preferably identical to the resin used in the first step. Then, the assembly of the electrical conductors 20 and the electrical support 100 coated with the second layer of resin is cured at the nominal polymerization temperature of the resin.

The repetition of the impregnation by the insulation resin makes it possible to render the electric wires integral with the electrical support, and the pre-curing at a temperature lower than the polymerization temperature makes it possible to render the elements integral with one another, and therefore to reinforce their mechanical strength and the transmission of heat.

The invention described is characterized by the use of an insulating powder based on silicon on each of the electrical conductors and on the electrical supports forming an electrical machine.

While illustrative embodiments have been illustrated and described, it will be appreciated that various changes can be made therein without departing from the spirit and scope of the invention.

The embodiments of the invention in which an exclusive property or privilege is claimed are defined as follows:

1. An electromagnetic armature comprising an electromagnetic yoke having a cylindrical surface with an axis z which is designed to be opposite an air gap surface, the cylindrical surface being known as an interaction surface, a plurality of teeth forming magnetic poles, the teeth being associated in a projecting manner with the interaction surface in the direction of the air gap surface, and disposed spaced all around the yoke, characterized in that each tooth comprises a recess arranged in one of the faces of the tooth on a so-called polar plane orthogonal to the direction z, the recess being designed to receive a winding, and in that said teeth are arranged on the yoke such that the recesses are disposed alternately on both sides of the polar median plane which passes through the middle of the yoke.

2. The electromagnetic armature of claim 1, characterized in that the winding surrounds completely the periphery of each of the teeth whilst being accommodated in each recess.

3. The electromagnetic armature of claim 1, characterized in that the winding is undulating, i.e., it passes along only part of each tooth, going from one magnetic pole to another, and changing polar face at each magnetic pole, whilst being accommodated in each recess.

4. The electromagnetic armature of claim 1, characterized in that one or a plurality of teeth is/are independent from the yoke, and is/are added on in a detachable manner against the yoke.

5. The electromagnetic armature of claim 4, characterized in that the added-on detachable teeth are disposed spaced all around the yoke.

6. The electromagnetic armature of claim 4, characterized in that, when the teeth are detachable, they are pushed partially into the yoke, a length of pushing said detachable teeth into the yoke in a radial direction with an axis y being between a value of 0 mm and 10 mm.

7. The electromagnetic armature of claim 4, characterized in that the added-on detachable teeth are associated with the yoke by fitting and/or by means of a wedge arranged in the base of a cavity in the yoke and interfacing the teeth and the yoke.

8. The electromagnetic armature of claim 1, characterized in that the electromagnetic yoke is formed by metal plates which are arranged substantially parallel to a plane x-y perpendicular to the axis z, and stacked in the direction z, whereas the teeth are formed by metal plates which are arranged substantially parallel to the plane y-z, and stacked either in the polar direction of rotation known as $\Theta$, or in the tangential direction x, or in a variable direction substantially perpendicular to the axis of rotation z.

9. The electromagnetic armature of claim 1, characterized in that the teeth are formed by a stacked metal plates or from SMC powder.

10. The electromagnetic armature of claim 1, characterized in that the number of teeth is at least equal to the number of magnetic poles of the electrical machine for which the armature is destined.

11. The electromagnetic armature of claim 1, characterized in that the winding and/or the yoke and the teeth of the armature are covered with a thermal lacquering insulating resin based on silicon, of the type used for thermal lacquering of flat metal plates known as thermal plates, or for thermal ovens or barbecues or table cookers, in particular resin comprising at least 20% silicon, or also at least 98% silicon, and which can also comprise acrylic and/or epoxy.

12. The electromagnetic armature of claim 1, characterized in that the surface of interaction between the yoke and the teeth is substantially circular, and is defined by a line of separation which is translated in the direction of the axis z, the line of separation being:

either a portion of a circle or an ellipse, or a straight line, or a triangle;

or a broken line, which in particular is rectangular or triangular or trapezoidal, thus making it possible to push the tooth into the yoke, the tooth preferably being pushed into the yoke in a direction which is inclined relative to the tangential surface of the yoke, and preferably according to a dimension of approximately D/2, where D corresponds to the width of the tooth in the direction x; and or a broken rectangular or triangular line which makes it possible to place the tooth above the yoke.

13. A rotating electrical machine comprising at least one electromagnetic armature of claim 1, forming a stator, and an annular magnetized rotor, the magnets of which are situated opposite the air gap surface, in order to constitute a monophase machine with a single electromagnetic armature, or a polyphase machine comprising an assembly in the direction of the axis z of a plurality of spaced electromagnetic armatures.

14. A method for production of an electromagnetic armature of claim 1, characterized in that the winding is configured before association with the yoke, or is obtained on the yoke by winding at least one electrically conductive wire, and in particular the winding is produced or is associated with the armature from amongst the following possibilities:

the winding is produced on an annular spindle;

the winding is produced on detachable false teeth which are fitted on the yoke;

the previously produced winding is associated with the bare yoke, keeping it in place by means of wedges which are disposable or removable after insertion, then the teeth are arranged;

separating the winding into sub-windings which are inserted separately;

inserting the winding on the yoke where only some of the teeth, i.e. those with the same polarity, have been put into place definitively;

using detachable false teeth during the step of insertion of the winding, then replacing them by the definitive teeth, the false teeth advantageously being made of plastic material or of polished stainless steel.

15. The production method of claim 14, characterized in that it provides electrical insulation of the winding and/or of the head and/or of the teeth, the electrical insulation comprising the following steps:

in a first step, coating each of the elements which constitute the wire(s) forming the winding, as well as optionally the winding support(s), such as the yoke and/or the teeth, with a thermal lacquering insulating resin based on silicon, of the type used for thermal lacquering of thermal flat metal plates or thermal ovens or barbecues or table cookers, the insulating resin preferably being applied by means of an electrostatic method, using a powder which is sprayed;

in a second step, curing the insulating resin in an oven at a normal temperature, indicated by the manufacturer, typically 220° C., or curing the resin at a temperature lower than the nominal polymerization temperature, for example between 150° C. and 180° C.;

in a third step, assembling the elements when cold or hot;

in a fourth step, if applicable repeating the three preceding steps on the assembled assembly formed by the winding, the yoke and the teeth; if, in a second step the curing has been carried out at a temperature lower than the nominal polymerization temperature, curing of the assembled assembly is then necessary.

* * * * *